United States Patent
Bruno et al.

(10) Patent No.: US 11,860,745 B2
(45) Date of Patent: Jan. 2, 2024

(54) REDUNDANT EDGE HARDWARE

(71) Applicant: Dell Products L.P., Round Rock, TX (US)

(72) Inventors: Eric Bruno, Shirley, NY (US); Dragan Savic, Toronto (CA)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/713,304

(22) Filed: Apr. 5, 2022

(65) Prior Publication Data
US 2023/0315590 A1   Oct. 5, 2023

(51) Int. Cl.
*G06F 11/20* (2006.01)
*G06F 11/14* (2006.01)
*G06F 11/36* (2006.01)

(52) U.S. Cl.
CPC ...... *G06F 11/2002* (2013.01); *G06F 11/1438* (2013.01); *G06F 11/3688* (2013.01); *G06F 11/3692* (2013.01)

(58) Field of Classification Search
CPC ............ G06F 11/2002; G06F 11/1438; G06F 11/3688; G06F 11/3692
USPC ........................................................ 714/736
See application file for complete search history.

(56) References Cited

U.S. PATENT DOCUMENTS

| | | | | |
|---|---|---|---|---|
| 5,416,740 A | * | 5/1995 | Fujita | G11C 29/808 365/201 |
| 7,389,460 B1 | * | 6/2008 | Demara | G11C 29/40 714/733 |
| 2002/0144175 A1 | * | 10/2002 | Long | G06F 11/181 714/11 |
| 2011/0173482 A1 | * | 7/2011 | Penton | G06F 11/1641 714/E11.178 |
| 2012/0047406 A1 | * | 2/2012 | Nakatani | G05B 9/03 714/49 |
| 2016/0224447 A1 | * | 8/2016 | Nakao | G06F 11/0727 |

OTHER PUBLICATIONS

Tech Target, "SRAM," https://whatis.techtarget.com/definition/SRAM-static-random-access-memory#:~:text=SRAM, Accessed Mar. 10, 2022, 2 pages.
Wikipedia, "Loopback," https://en.wikipedia.org/wiki/Loopback, Jan. 25, 2022, 4 pages.
Wikipedia, "Redundancy (engineering)" https://en.wikipedia.org/wiki/Redundancy, Mar. 9, 2022, 7 pages.

* cited by examiner

Primary Examiner — James C Kerveros
(74) Attorney, Agent, or Firm — Ryan, Mason & Lewis, LLP

(57) ABSTRACT

A method comprises executing a testing operation on a plurality of redundant components of an edge device. In one example, based, at least in part, on the testing operation, at least one redundant component of the plurality of redundant components is identified as having an operational issue, and the at least one redundant component is deactivated in response to the identifying. One or more remaining redundant components of the plurality of redundant components are utilized in one or more operations following the testing operation.

20 Claims, 11 Drawing Sheets

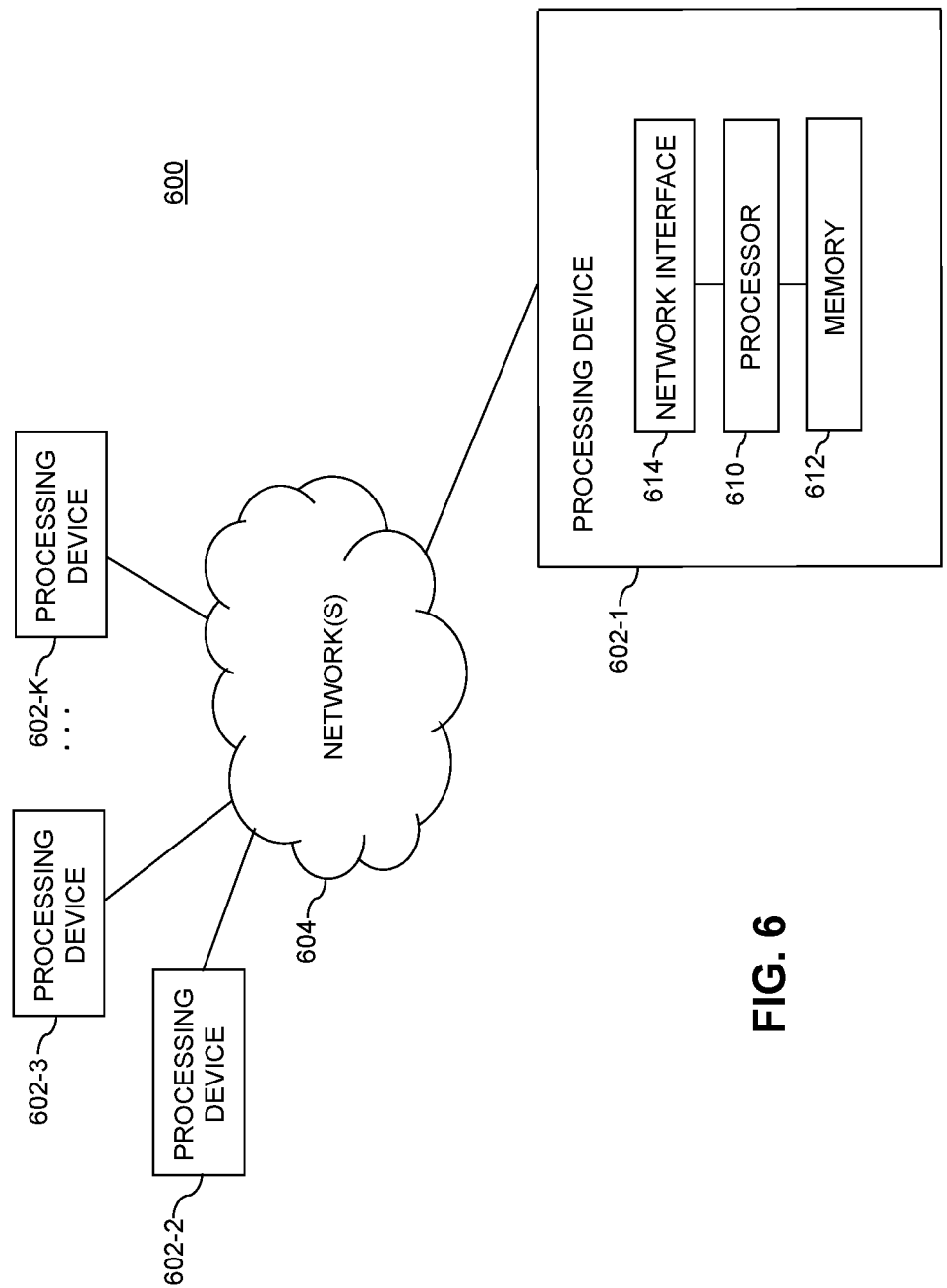

REDUNDANT EDGE HARDWARE

FIELD

The field relates generally to computing environments and, more particularly, to the implementation of redundancies in edge hardware.

BACKGROUND

An edge computing architecture moves at least a portion of data processing to the periphery of a network to be closer to a data source rather than to a centralized location, e.g., data center. For example, instead of transmitting raw data to a data center to be processed and analyzed, such tasks or workloads are performed at or near locations where the data is actually generated. In this manner, for example, network parameters such as bandwidth can be increased, while processing, storing and network parameters such as latency and congestion can be reduced, thus improving overall system performance.

Some edge locations such as, for example, telecommunications towers, automated industrial environments and outer space may be difficult, expensive and/or dangerous to reach. Additionally, the continuous operation and/or safe failover of edge devices in these locations may be required. Maintaining continuous processing of critical workloads at the edge, along with safe data storage, especially at locations that are hard to reach and/or unsuitable to the longevity of typical computer hardware can pose significant technical problems.

SUMMARY

Embodiments provide techniques for the provision of redundant edge hardware in edge computing architectures.

For example, in one illustrative embodiment, a method comprises executing a testing operation on a plurality of redundant components of an edge device. In one example, based, at least in part, on the testing operation, at least one redundant component of the plurality of redundant components is identified as having an operational issue, and the at least one redundant component is deactivated in response to the identifying. One or more remaining redundant components of the plurality of redundant components are utilized in one or more operations following the testing operation.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

Advantageously, illustrative embodiments provide techniques for periodically checking for issues with various types of edge hardware components and isolating components determined to have issues, while maintaining the operation of healthy components. Technical solutions illustratively described herein provide an autonomous system that enables edge servers to internally use redundant components to process workloads without failing over to another server.

These and other features and advantages of embodiments described herein will become more apparent from the accompanying drawings and the following detailed description.

BRIEF DESCRIPTION OF THE DRAWINGS

FIGS. 5 and 6 show examples of processing platforms that may be utilized to implement at least a portion of an information processing system used to manage component failure in edge hardware in illustrative embodiments.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising edge computing, cloud computing and storage systems, as well as other types of processing systems comprising various combinations of physical and virtual processing resources.

As used herein, a "component" is to be broadly construed, and can refer to various parts and/or hardware components such as, but not necessarily limited to, central processing units (CPUs), graphics processing units (GPUs) or other processors, storage devices (e.g., hard disk drives, random access memory (RAM), or other memories), controllers (e.g., network interface controllers (NICs)), ports, port connectors, host bus adaptors (HBAs), batteries, motherboards, cards, switches, sensors, buses (e.g., serial buses) or other elements of a computing environment that may fail or malfunction.

As used herein, "redundant," "redundant component" and/or "redundancy" is to be broadly construed, and can refer to a duplicate component of an edge device or system which can be used in parallel with other duplicate components and/or in place of one or more duplicate components in the event of failure or malfunctioning of the one or more of the duplicate components. The number of redundant components in an edge device may vary. Also, in addition to exact duplicate components, the term duplicate component can also include a near duplicate component or a substantially duplicate component in that there may be some difference in the components, but the intended function performed by the component is the same.

Figure 1A:
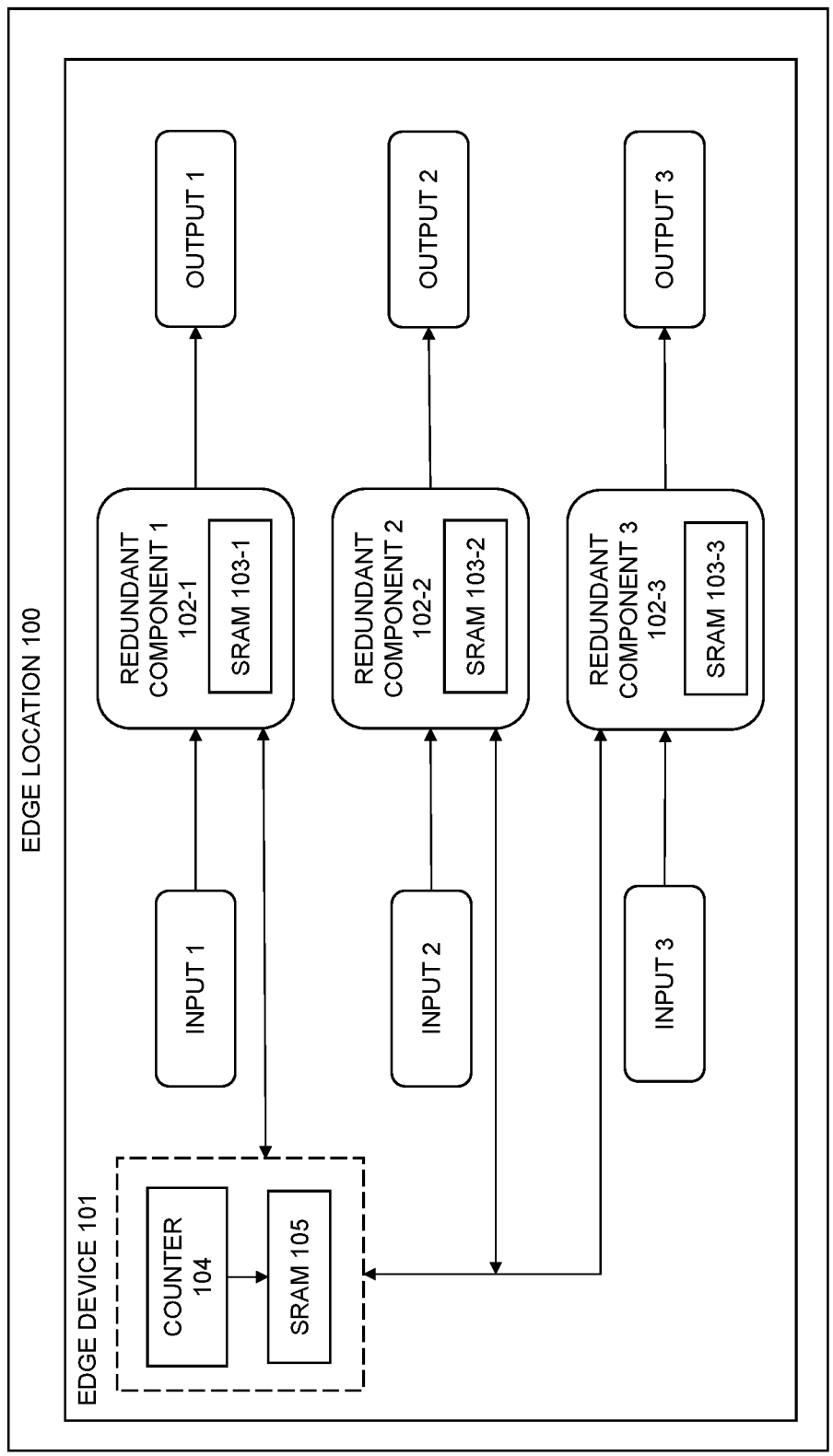
FIG. 1A is a block diagram of normal operation of an edge device configured for managing component failure in an illustrative embodiment.

FIG. 1A depicts an edge location 100 comprising an edge device 101 configured for managing component failure in an illustrative embodiment. The edge device 101 can comprise, for example, a desktop, laptop or tablet computer, server, storage device or other type of processing device capable of processing workloads or other operations. Such devices are examples of what are more generally referred to herein as "processing devices." Some of these processing devices are also generally referred to herein as "computers." In some embodiments, an edge device 101 may also comprise virtualized computing resources, such as virtual machines (VMs), containers, etc. The edge device 101 in some embodiments comprises a computer associated with a particular company, organization or other enterprise. Although one edge device 101 is shown, the embodiments are not necessarily limited thereto, and an edge location 100 may comprise more than one edge device 101.

Workloads and other operations comprise, for example, applications running as single components or several components working together, input-output (IO) operations (e.g., data read and/or write operations), data transmission operations, or other operations, with an edge device 101 providing computational resources to allow workloads or other operations to complete tasks. The size of a workload or other operation may be dependent on the amount of data and applications included in a given workload or operation.

The terms "client," "customer," "administrator" or "user" herein are intended to be broadly construed so as to encompass numerous arrangements of human, hardware, software or firmware entities, as well as combinations of such entities. In some embodiments, users may refer to customers, clients and/or administrators of computing environments for which component failure management is being performed. Compute and/or storage services (e.g., at least a portion of the available services and functionalities provided by the edge devices 101) may be provided for users under a Platform-as-a-Service (PaaS) model, an Infrastructure-as-a-Service (IaaS) model, a Function-as-a-Service (FaaS) model, a Containers-as-a-Service (CaaS) model and/or a Storage-as-a-Service (STaaS) model, including cloud-based PaaS, IaaS, FaaS, CaaS and STaaS environments, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

Although not explicitly shown in FIG. 1A, one or more input-output devices such as keyboards, displays or other types of input-output devices may be used to support one or more user interfaces to an edge device 101, as well as to support communication between multiple edge devices 101, connected devices and/or other related systems and devices not explicitly shown.

A network or networks referenced herein may be implemented using multiple networks of different types. For example, a network may comprise a portion of a global computer network such as the Internet, although other types of networks can be part of the network including a wide area network (WAN), a local area network (LAN), a satellite network, a telephone or cable network, a cellular network, a wireless network such as a WiFi or WiMAX network, a storage area network (SAN), or various portions or combinations of these and other types of networks. The network in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1A, which depicts normal operation of the edge device 101, the edge device 101 comprises a plurality of redundant components 1, 2 and 3 102-1, 102-2 and 102-3 (collectively, "redundant components 102") each comprising a static random access memory (SRAM) 103-1, 103-2 and 103-3, respectively, (collectively, "SRAMs 103"). Although three redundant components 102 and corresponding SRAMs 103 are shown, the embodiments are not limited thereto, and an edge device 101 may comprise more or less than three redundant components 102 and corresponding SRAMs 103. Each of the redundant components 102 is connected to a counter 104 and another SRAM 105. As explained in more detail herein below, the counter 104 is configured to count a number of occurrences of context switching by respective ones of the redundant components 102, and the SRAMs 103 and 105 are encoded with a testing operation. Although illustrative embodiments comprise SRAMs 103 and 105, the embodiments are not limited thereto, and may utilize other types of memory.

During normal operation of the edge device 101, redundant components 1, 2 and 3 102-1, 102-2 and 102-3 respectively receive Inputs 1, 2 and 3 and produce Outputs 1, 2 and 3. The Inputs 1, 2 and 3 comprise for example, the workloads or other operations as described herein above, and the Outputs 1, 2 and 3 comprise the results of processing the workloads or other operations. For example, according to one or more embodiments, if the redundant components 102 comprise CPUs, the Inputs 1, 2 and 3 can be respective workloads that are processed in parallel by the CPUs, and the Outputs 1, 2 and 3 can be respective results of the processing by the CPUs. If the redundant components 102 comprise storage devices (e.g., RAMs, hard-disk drives (HDDs), solid-state drives (SSDs), etc.) the Inputs 1, 2 and 3 can be respective instances of data to be stored by the storage devices, and the Outputs 1, 2 and 3 can be respective instances of stored data by the storage devices. In another example, if the redundant components 102 are NICs, the Inputs 1, 2 and 3 can be respective data packets to be routed to a network by the NICs, and the Outputs 1, 2 and 3 can be respective routed data packets.

Figure 1B:
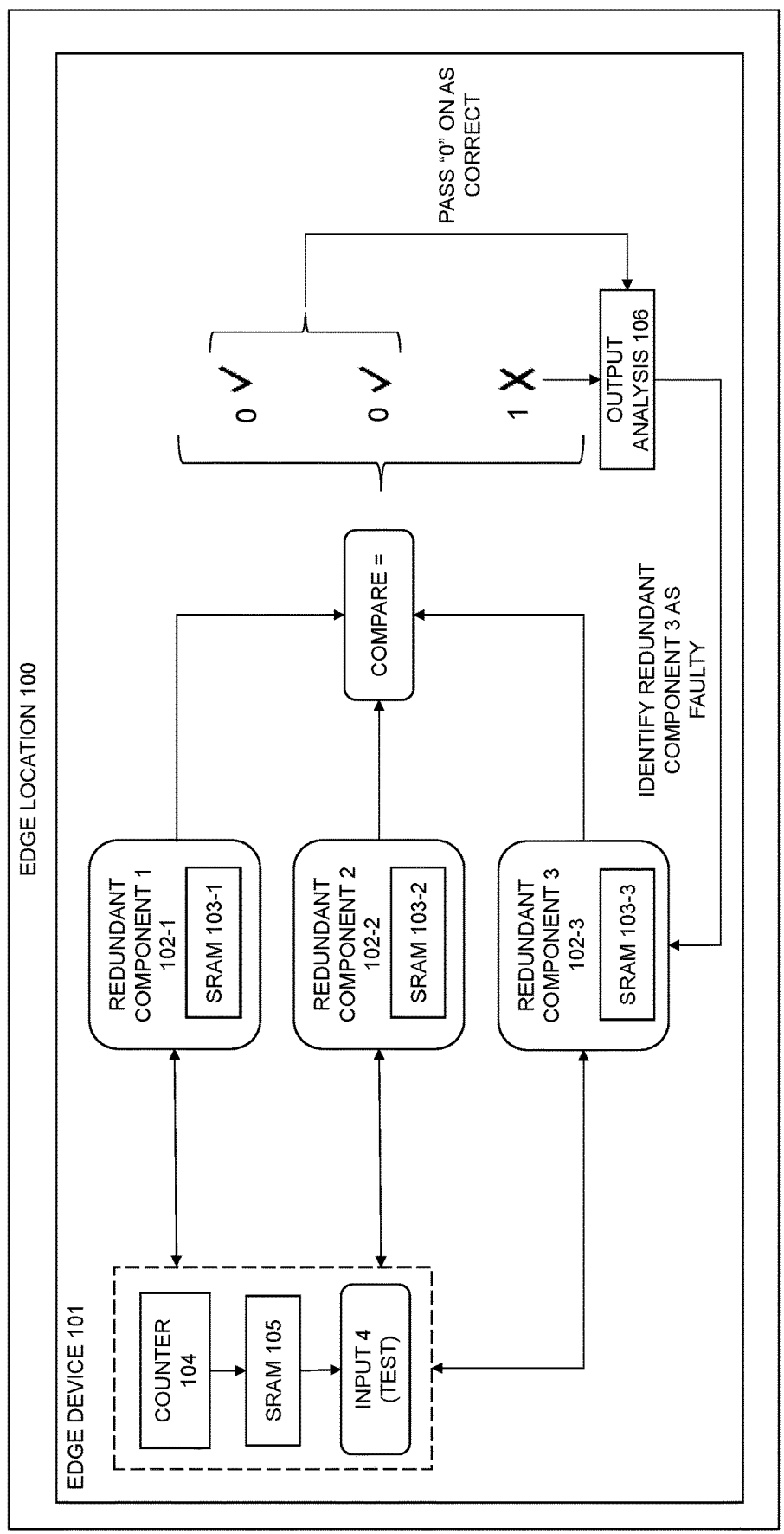
FIG. 1B is a block diagram of a testing operation executed on an edge device configured for managing component failure in an illustrative embodiment.

Referring to FIG. 1B, an algorithm encoded as a test workload stored in an SRAM 105 (e.g., on-chip SRAM) or a register, and/or on SRAMs 103 or respective registers of the redundant components 102 is periodically executed on the redundant components 102. In an illustrative embodiment, a testing operation is performed when the redundant components 102 are performing context switching. In more detail, a periodic testing operation to perform a health check of the redundant components 102 is executed at configurable and dynamic periods that are adjusted based, for example, on workloads running on the redundant components 102 and other factors.

For example, the edge device 101 will schedule a testing operation when most redundant components 102 are performing context switching (e.g., while waiting for long IO operations and/or switching to another task, a testing operation will be executed on the redundant components 102). In one or more embodiments, in the case of dynamic random access memory (DRAM) redundant components 102, the edge device 101 will schedule a testing operation during DRAM refresh intervals for a majority of the redundant components 102. In illustrative embodiments, a testing operation cycle serves as a refresh cycle, whereby no or very little additional latency is introduced in the use of RAM by the edge device 101. In other embodiments, in the case of SSDs or other storage devices, the edge device 101 will schedule a testing operation during periods of low storage device IO for a majority of the redundant components 102. Context switching, refresh intervals and/or periods of low IO may occur during relatively brief periods on the order of milliseconds (e.g., 5 ms). Depending on when context switching, refresh intervals and/or periods of low IO occur, time periods for executing the testing operation are dynamically adjusted.

In some embodiments, a device level counter 104 used across all of the redundant components 102 tracks a number of context switching, refresh interval and/or low IO occurrences corresponding to the redundant components 102. The counter 104 can be configured to signal an SRAM 105 to commence a testing operation when the number of occurrences of context switching, refresh intervals, and/or low IOs corresponding to the respective ones of the redundant components 102 reaches or exceeds a predetermined threshold number of context switching, refresh interval and/or low IO occurrences. For example, after each or one or more of the redundant components 102 reaches or exceeds the threshold number of context switching, refresh interval and/or low IO occurrences, the testing operation is performed during the next instance of context switching, a refresh interval and/or low IO by a majority of the redundant components 102.

According to illustrative embodiments, the SRAM 105 transmits an input (Input 4) to the respective SRAMs 103 instructing the SRAMs 103 to execute the test workloads stored in the SRAMs 103 so that the testing operation can be run on respective ones of the redundant components 102. Alternatively, the SRAMs 103 receive input directly from the counter 104 to commence the testing operation on the respective ones of the redundant components 102. In another alternative, in the absence of SRAMs 103, the SRAM 105 stores the test workload and transmits to the redundant components 102, the test workload to be executed on the respective ones of the redundant components 102.

As can be seen in FIG. 1B, the testing operation comprises invoking a voting pattern in connection with test workload outputs of respective ones of the redundant components 102. For example, a common test operation is executed redundantly across each of the redundant components 102 and the respective outputs of the redundant components 102 from the testing operation are compared (Compare=). Based on the comparing, a determination is made whether one or more of the respective outputs (e.g., "1" in FIG. 1B) differs from a plurality of same outputs (e.g., "0" in FIG. 1B) comprising a majority of the respective outputs. An output analysis layer 106 identifies the redundant component 102 corresponding to the different output (e.g., "1" (redundant component 3 102-3)) as a faulty component (e.g., having an operational issue causing it to fail or malfunction) since its output is not consistent with the majority of outputs.

For example, in the case of redundant components 102 that are CPUs, a common test workload is executed redundantly across all of the CPUs, and their individual outputs of processing the test workload are compared to determine any inconsistencies. In the case of redundant components 102 that are storage devices, common test data is stored across all of the storage devices, and is compared to determine any inconsistencies. For example, if the stored data of one of the redundant storage devices is not consistent with that of a majority of the redundant storage devices, the output analysis layer 106 concludes that the redundant storage device corresponding to the inconsistency is faulty. In some embodiments, redundant storage devices are written to using test patterns, read back and compared to the test pattern to ensure no errors have occurred. If there are inconsistencies with the test pattern, the output analysis layer 106 concludes that the redundant storage devices corresponding to the inconsistencies are faulty. In another example, if a test operation is not able to be completed on a given one of the redundant components 102, the output analysis layer 106 identifies the given one of the redundant components 102 as faulty.

Figure 1C:
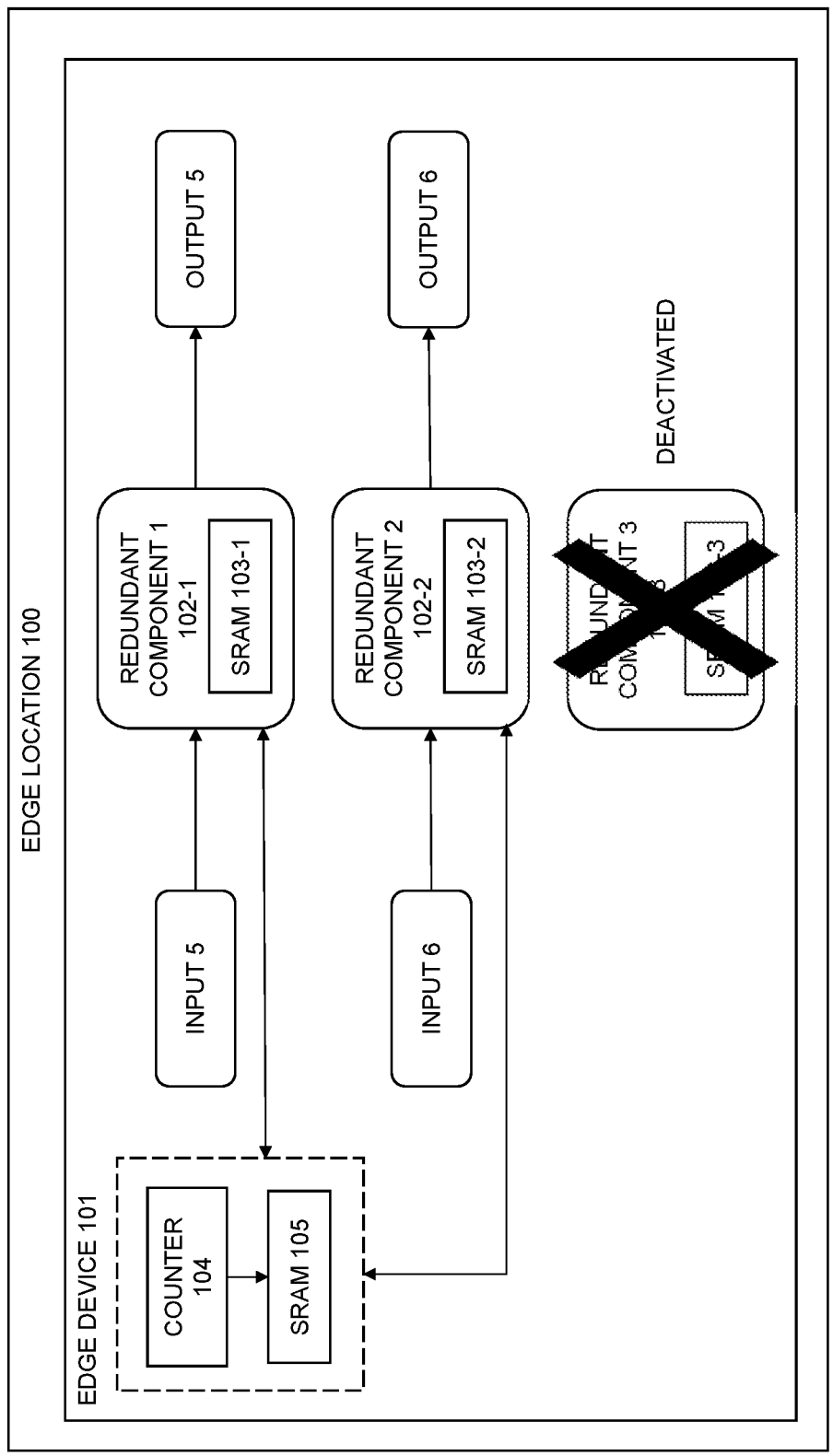
FIG. 1C is a block diagram of an operation of an edge device configured for managing component failure, wherein a component is deactivated, in an illustrative embodiment.

Referring to FIG. 1C, according to an embodiment, the edge device 101 performs a "circuit breaker" function by preventing new inputs from being routed to the redundant component 3 102-3 identified as faulty, effectively deactivating the redundant component 3 102-3 so that it does not receive new workloads and is prevented from being used in other operations. As shown in FIG. 1C, new inputs (e.g., Input 5 and Input 6) are routed to the redundant components 1 and 2 102-1 and 102-2, but not to deactivated redundant component 3 102-3. Processing by redundant components 1 and 2 102-1 and 102-2 produces Output 5 and Output 6. Accordingly, one or more remaining redundant components not found to be faulty are utilized in operations following the testing operation.

In some embodiments, once the circuit breaker is effectively thrown and one or more redundant components 102 determined to be faulty are deactivated, depending on additional component availability, the deactivated redundant component(s) can be automatically swapped with working replacement component(s) so that the number of redundant components 102 performing parallel processing at a given time is not reduced.

Figure 2A:
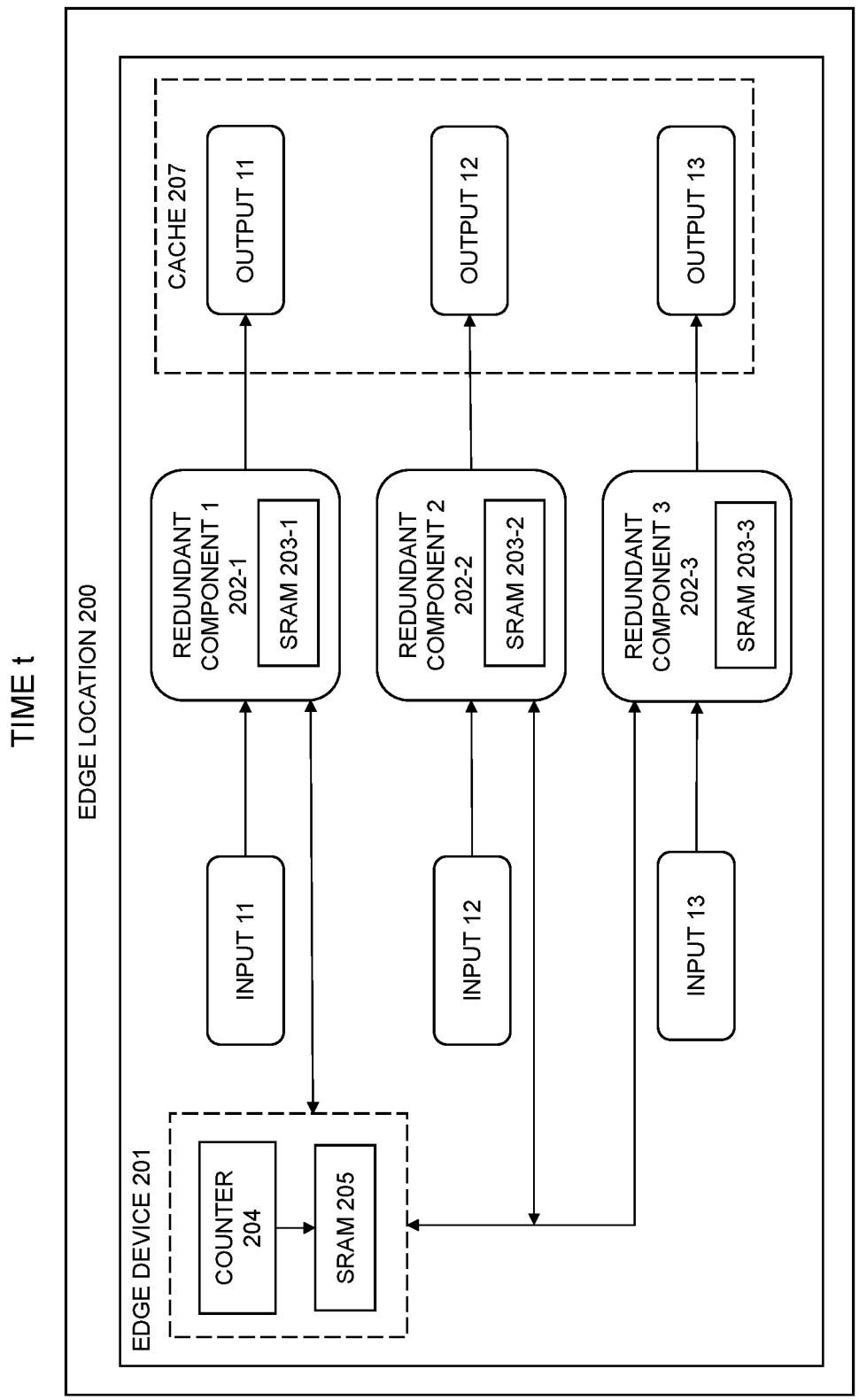
FIG. 2A is a block diagram of normal operation of an edge device configured for managing component failure, wherein outputs are stored in a cache pending results of a testing operation, in an illustrative embodiment.

FIG. 2A illustrates normal operation of an edge device 201 in edge location 200. The edge device 201 has a similar configuration to the edge device 101. Like the edge device 101, the edge device 201 comprises a plurality of redundant components 1, 2 and 3 202-1, 202-2 and 202-3 (collectively, "redundant components 202") each comprising an SRAM 203-1, 203-2 and 203-3, respectively, (collectively, "SRAMs 203"). The redundant components 202 and SRAMs 203 are configured the same as or similarly to the redundant components 102 and SRAMs 103. Although three redundant components 202 and corresponding SRAMs 203 are shown, the embodiments are not limited thereto, and an edge device 201 may comprise more or less than three redundant components 202 and corresponding SRAMs 203. Each of the redundant components 202 is connected to a counter 204 and another SRAM 205, which are configured the same as or similar to the counter 104 and SRAM 105.

During normal operation of the edge device 201, redundant components 1, 2 and 3 202-1, 202-2 and 202-3 respectively receive Inputs 11, 12 and 13 and produce Outputs 11, 12 and 13 in the same manner as or in a similar manner to the receipt of Inputs 1, 2 and 3 and the production of Outputs 1, 2 and 3. According to the embodiment in FIG. 2A, when the Outputs 11, 12 and 13 are generated, they are timestamped. For purposes of explanation, we assume that the Outputs 11, 12 and 13 are timestamped with time t. However, the actual time of the timestamp may vary between Outputs 11, 12 and 13. In addition to the timestamp, the outputs are tagged with other metadata identifying, for example, the redundant component 202 that produced the output (e.g., component identifiers, component name, etc.). In illustrative embodiments, firmware of storage devices (e.g., SSDs) will add timestamps in data writes to storage. As can be seen in FIG. 2A, the Outputs 11, 12 and 13 are stored in a storage location of the edge device 201 such as, for example, a dedicated cache 207 or other location. As explained in more detail in connection with FIGS. 2B, 2C and 2D, the Outputs 11, 12 and 13 are stored until after a testing operation is performed and faulty redundant components 202, if any, are identified.

Figure 2B:
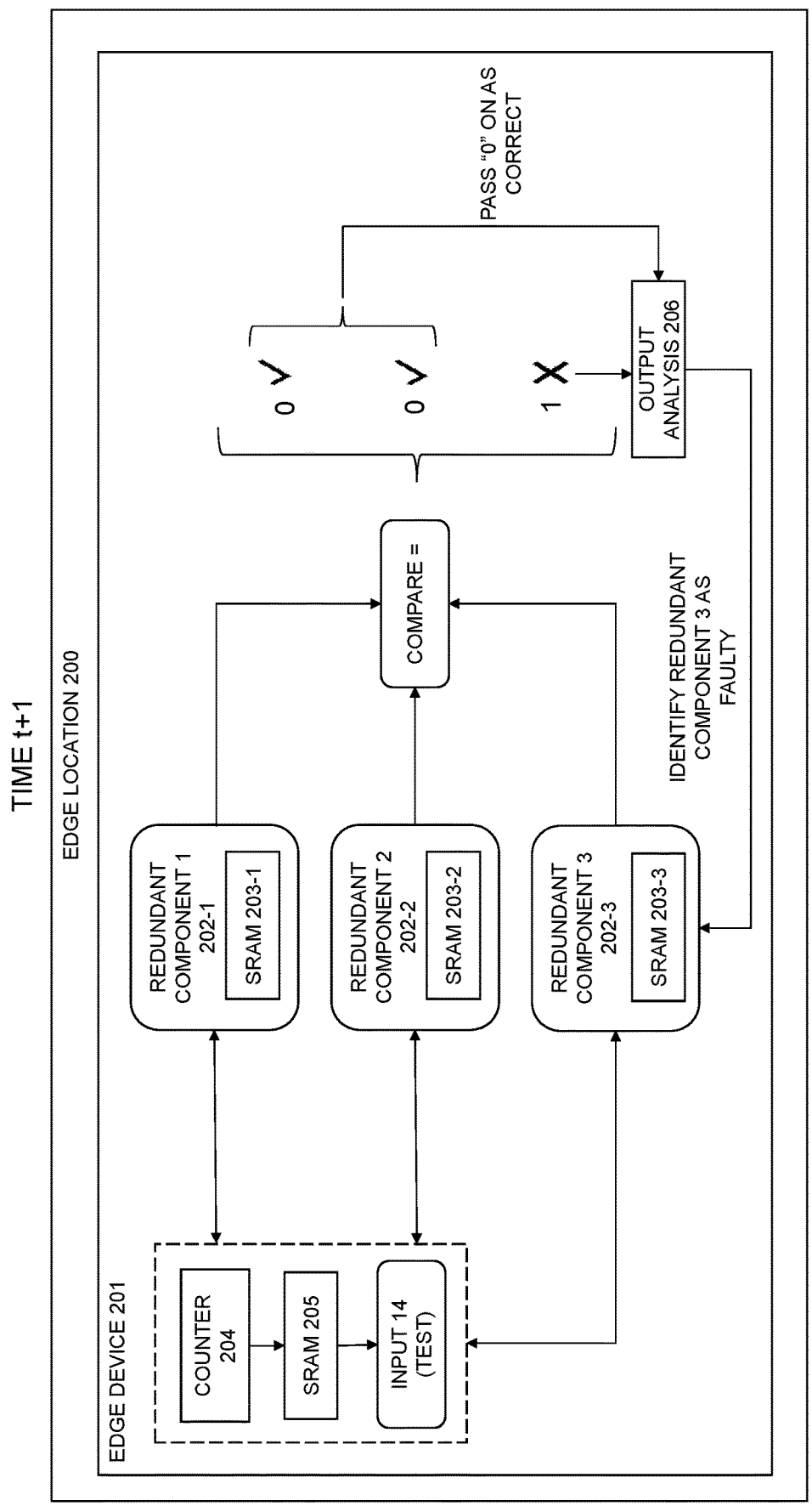
FIG. 2B is a block diagram of a testing operation executed on an edge device configured for managing component failure in an illustrative embodiment.

For example, referring to FIG. 2B, at time t+1, similar to the testing operation described in connection with FIG. 1B, a common test operation (Input 14 (Test)) is executed redundantly across each of the redundant components 202 and the respective outputs of the redundant components 202 from the testing operation are compared (Compare=). The output from redundant component 3 202-3 (e.g., "1" in FIG. 2B) differs from a plurality of same outputs from redundant components 1 and 2 202-1 and 202-2 (e.g., "0" in FIG. 2B). An output analysis layer 206 identifies redundant component 3 202-3 corresponding to the different output (e.g., "1") as a faulty component since its output is not consistent with the majority of outputs. Similar to the edge device 101, timing of a testing operation for the edge device 201 is dynamically adjusted based on, for example, when context switching, refresh intervals and/or periods of low IO occur for the redundant components 202. In addition, similar to the edge device 101, techniques for comparing outputs and the content of the outputs may vary based on whether the redundant components 202 comprise, for example, CPUs, storage devices, NICs or other devices.

Figure 2C:
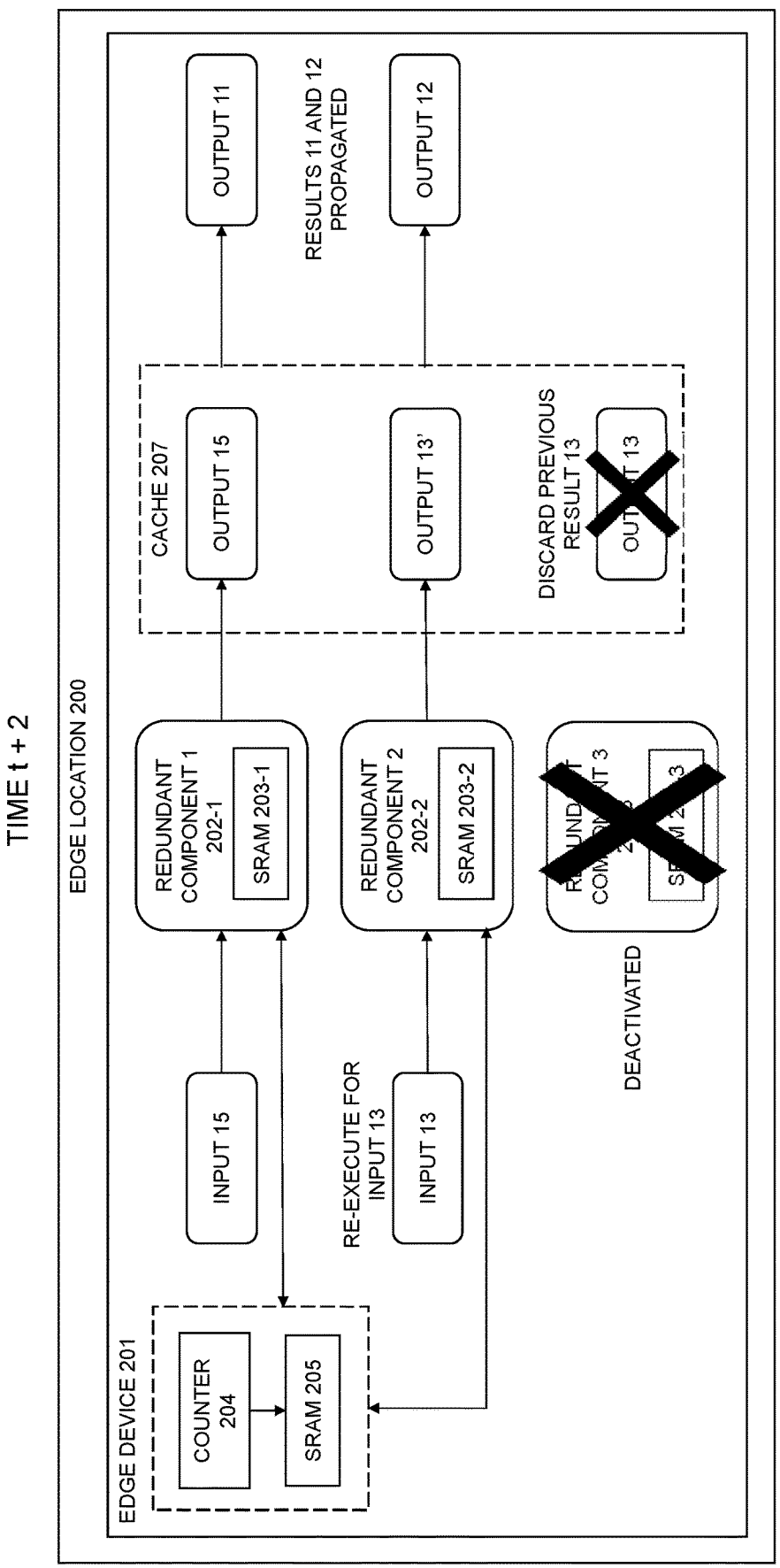
FIG. 2C is a block diagram of an operation of an edge device configured for managing component failure, wherein a component is deactivated and its corresponding output is discarded, in an illustrative embodiment.

Referring to FIG. 2C, at time t+2, similar to FIG. 1C, the edge device 201 performs a circuit breaker function by preventing new inputs from being routed to the redundant component 3 202-3 identified as faulty, effectively deactivating the redundant component 3 202-3 so that it does not receive new workloads and is prevented from being used in other operations. In addition, the previous result from redundant component 3 202-3 from time t (Output 13) is invalidated and discarded since redundant component 3 202-3 may have had operational issues at time t when Output 13 was generated. In contrast, Outputs 11 and 12 corresponding to redundant components 1 and 2 202-1 and 202-2, which were determined to be healthy, are validated, released from the cache 207 and propagated. The Outputs 11, 12 and 13 are identified in the cache 207 based on their timestamps and other identifying metadata.

In illustrative embodiments, if a redundant component 202 is not identified as faulty (e.g., passes a test operation), the current time (e.g., time t+1) is recorded as the last known positive test result. If a redundant component 202 is identified as faulty (e.g., fails a test operation), outputs for the faulty redundant component 202 between a last known positive test result (e.g., a previous time a test operation was conducted) and the current time (e.g., time t+1) are discarded, or, if there was no previous test, outputs for the faulty redundant component 202 between and including the previous timestamp (e.g., time t) and the current time (e.g., time t+1) are discarded.

Since Output 13 was discarded, the operation for Input 13 is re-executed by a healthy one of the redundant components 202 (e.g., redundant component 2 202-2) and similar to the operation in FIG. 2A, the new output from processing Input 13 (Output 13') is stored in the cache 207. Additionally, a new input (e.g., Input 15) is routed to the redundant component 1 202-1. No inputs are routed to deactivated redundant component 3 202-3. Processing by redundant component 1 202-1 produces Output 15, which is also stored in cache 207. The remaining redundant components 1 and 2 202-1 and 202-2 not found to be faulty are utilized in operations following the testing operation at time t+2.

Figure 2D:
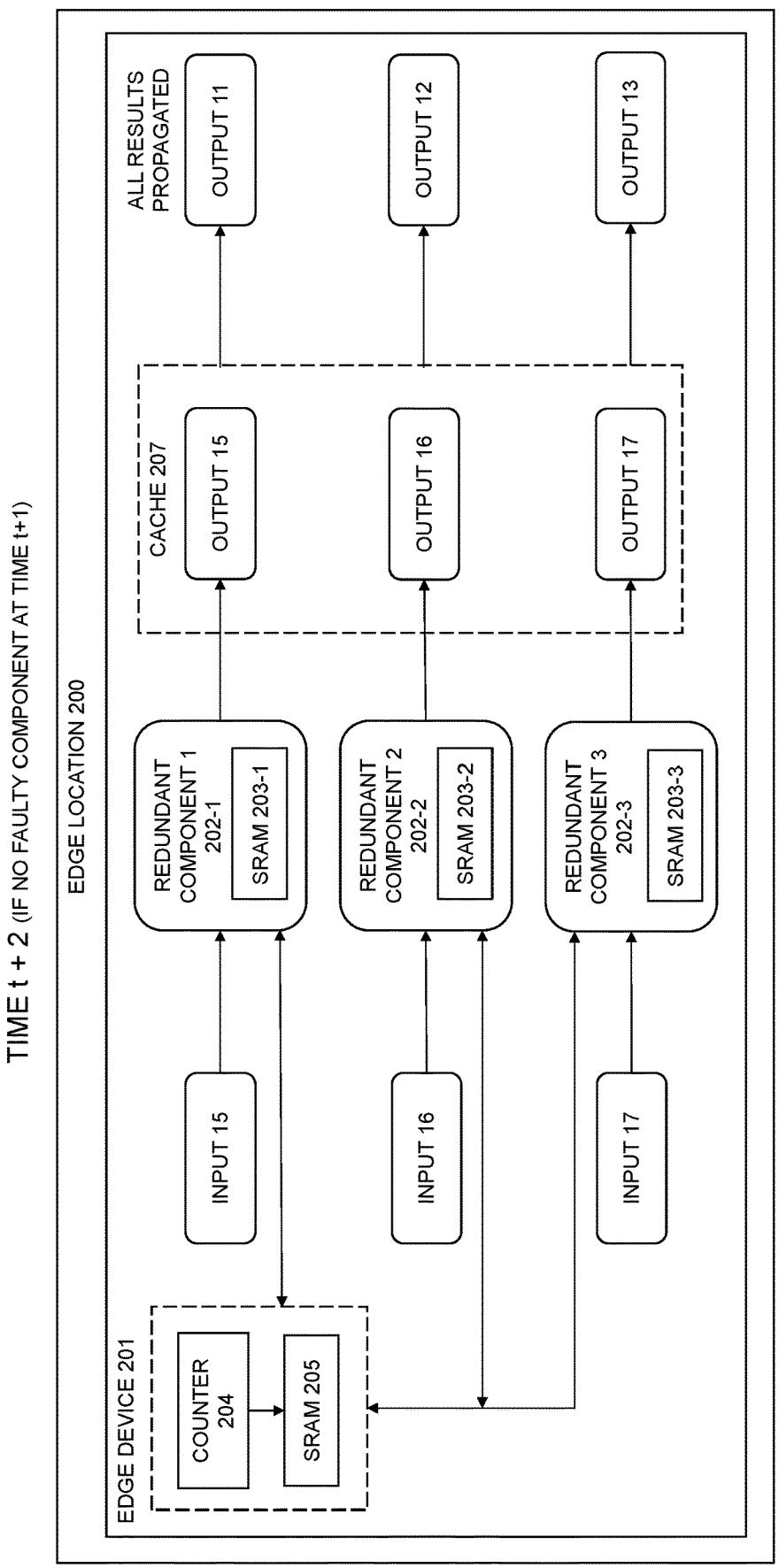
FIG. 2D is a block diagram of an operation of an edge device configured for managing component failure, wherein all outputs are propagated from a cache following a testing operation, in an illustrative embodiment.

FIG. 2D illustrates a scenario at time t+2, where no faulty redundant components 202 were found at time t+1. In the case where no faulty redundant components are found in a testing operation, the comparison of the outputs from the testing operation yields no inconsistent outputs. In other words, all of the outputs by the respective redundant components processing a test workload are the same. Referring to FIG. 2D, since all of the redundant components 202 are deemed healthy as a result of a testing operation at time t+1, each of the Outputs 11, 12 and 13 from time t are validated, released from the cache 207 and propagated. In addition, since there are no deactivated redundant components 202, none of the redundant components 202 are excluded from receiving new inputs, such that new Inputs 15, 16 and 17 are routed to the redundant components 1, 2 and 3 202-1, 202-2 and 202-3, respectively, which process the Inputs 15, 16 and 17 to generate Outputs 15, 16 and 17, which are stored in cache 207.

Figure 3:
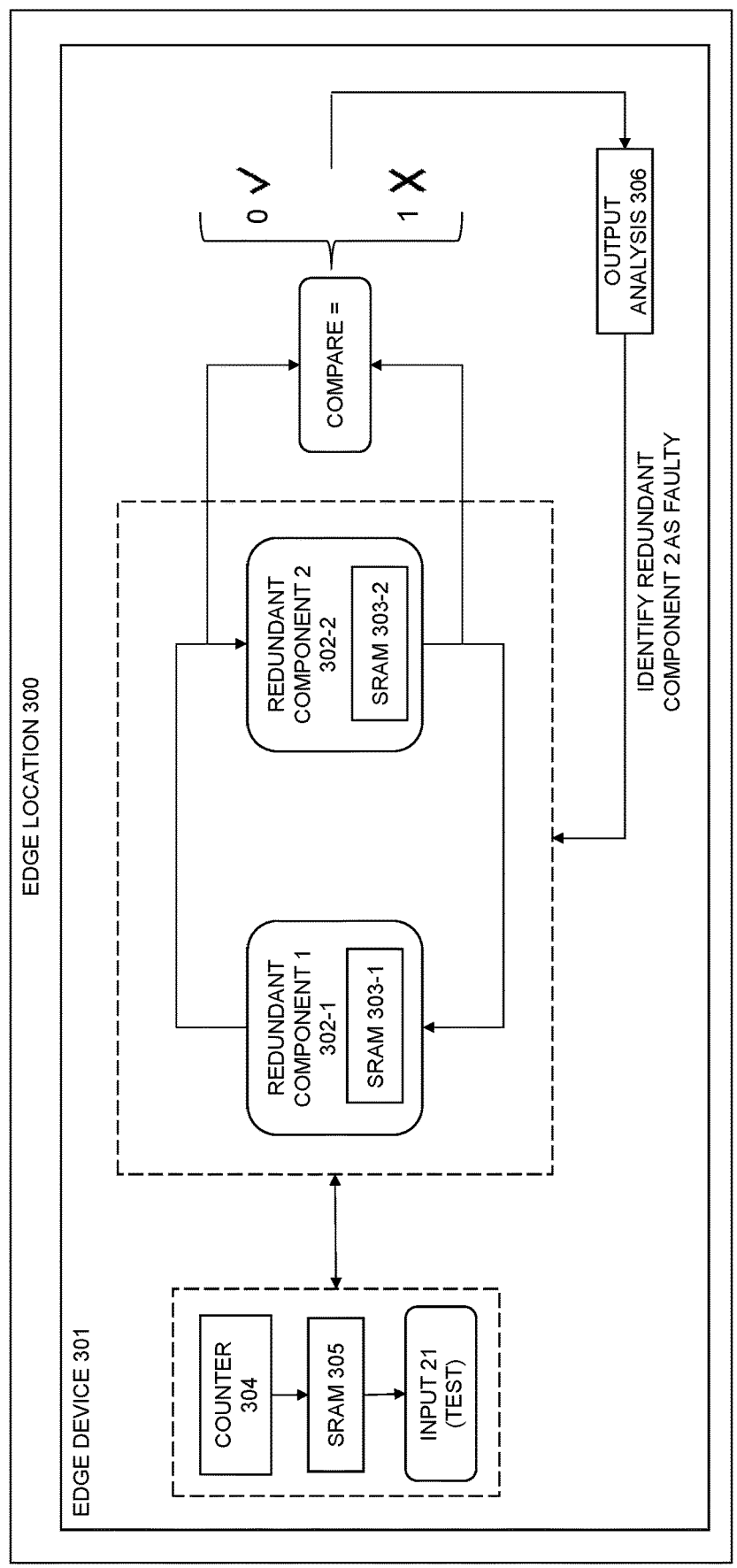
FIG. 3 is a block diagram of a testing operation executed on an edge device configured for managing component failure in an illustrative embodiment.

FIG. 3 illustrates a testing operation of an edge device 301 in edge location 300. The edge device 301 comprises a plurality of redundant components 1 and 2 302-1 and 302-2 (collectively, "redundant components 302") each comprising an SRAM 303-1 and 303-2, respectively, (collectively, "SRAMs 303"). The redundant components 302 and SRAMs 303 are configured the same as or similarly to the redundant components 102/202 and SRAMs 103/203 in FIGS. 1A-1C and 2A-2D. Although two redundant components 302 and corresponding SRAMs 303 are shown, the embodiments are not limited thereto, and an edge device 301 may comprise more or less than two redundant components 302 and corresponding SRAMs 303. Each of the redundant components 302 is connected to a counter 304 and another SRAM 305, which are configured the same as or similar to the counters 104 and 204, and SRAMs 105 and 205.

During a testing operation of the edge device 301, a first instance of test data (e.g., input 21 (Test)) is transmitted from redundant component 1 302-1 to redundant component 2 302-2, and a second instance of the test data is transmitted from the redundant component 2 302-2 back to redundant component 1 302-1 in a loopback operation. In this example, the redundant components 302 may be, for example, NICs. The first and second instances of the test data outputted from the redundant components 1 and 2 302-1 and 302-2, respectively, are compared (Compare=). Based on the comparing, a determination is made whether there are differences between the first and second instances of the test data. If there are differences, (e.g., "0" and "1"), an output analysis layer 306 identifies the redundant component 2 302-2 as a faulty component (e.g., having an operational issue causing it to fail or malfunction) since its output is not consistent with the source output (i.e., the output from redundant component 1 302-1). In one or more embodiments, the transmission of test data is in packets including a timestamp to test receipt and measure latency. In the event of a failed test (e.g., a redundant component is identified as faulty) on a given NIC and/or port, the given NIC and/or port will be deactivated to prevent network traffic from being routed through the given NIC and/or port and instead the network traffic will be routed through NICs and/or ports determined to be healthy. Data transmitted from the given NIC and/or port found to be faulty between a last known positive test result and a current time, or between and including a previous timestamp and the current time will be retransmitted through an NIC and/or port determined to be healthy.

Similar to the edge devices 101 and 201, timing of a testing operation for the edge device 301 is dynamically adjusted based on, for example, when context switching, refresh intervals and/or periods of low IO occur for the redundant components 302. In addition, similar to the edge devices 101 and 201, techniques for comparing outputs and the content of the outputs may vary based on whether the redundant components 302 comprise, for example, CPUs, storage devices, NICs or other devices. Other factors on which scheduling of testing operations can be based include, but are not necessarily limited to, maximum amounts of permitted latency, dynamically measured workload execution times and availability of resources for an edge device. For example, if a testing operation will result in exceeding a maximum amount of permitted latency, an edge device will schedule the testing operation for another time during which a maximum amount of permitted latency will not be exceeded. In the case of workload execution times, an edge device may schedule the testing operation during periods of relatively long workload execution times. With respect to resource availability, an edge device may schedule testing when there is sufficient cache space available to cache outputs during testing, which may also depend on the size of the outputs to be cached. The number of redundant components being tested at a given time may vary based on the availability of the respective redundant components to be part of a particular testing operation (e.g., whether the respective redundant components are performing context switching, refresh operations and/or are experiencing periods of low IO operations).

According to one or more embodiments, a deactivated redundant component 102, 202 or 302 is re-tested in a subsequent testing operation and can be reactivated if the deactivated redundant component passes the subsequent test. For example, in some cases, the reason a redundant component is determined to be faulty may be transient, such as, for example, due to weather conditions (e.g., temperature), network availability, power outages, etc., which may cause the redundant component to temporarily malfunction. Upon rectification of the transient condition, the redundant component may return to a healthy state and be reactivated for normal operations. In other scenarios, upon re-testing, a redundant component may continue to fail, possibly signaling a more serious issue with the redundant component. In this case, an alert to, for example, an administrator of the edge device and/or edge location, may be issued after a threshold number of test operation failures by a given redundant component.

The edge devices 101, 201 and 301, redundant components 102, 202 and 302, counters 104, 204 and 304 and other edge location or edge device elements in the embodiments are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as VMs or containers (e.g., Linux containers (LXCs)), or combinations of both as in an arrangement in which Docker containers or other types of LXCs are configured to run on VMs.

The edge devices 101, 201 and 301, redundant components 102, 202 and 302, and counters 104, 204 and 304, as well as other edge location or edge device elements may be implemented on respective distinct processing platforms, although numerous other arrangements are possible. For example, in some embodiments at least portions of one or more of the edge devices 101, 201 and 301, redundant components 102, 202 and 302, and counters 104, 204 and 304 are implemented on the same processing platform.

Additionally, the edge devices 101, 201 and 301, redundant components 102, 202 and 302, counters 104, 204 and 304 and other edge location or edge device elements in some embodiments may be implemented as part of a cloud-based system (e.g., a cloud service provider). The edge devices 101, 201 and 301, redundant components 102, 202 and 302, counters 104, 204 and 304 and other edge location or edge device elements can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. Communications to and from edge devices, redundant components and counters including, for example, workloads (normal and test), data packets and operational counts, may take place over one or more networks as described herein. The term "processing platform" as used herein is intended to be broadly construed so as to encompass, by way of illustration and without limitation, multiple sets of processing devices and one or more associated storage systems that are configured to communicate over one or more networks. Additional examples of processing platforms utilized to implement portions of the edge devices 101, 201 and 301, redundant components 102, 202 and 302, counters 104, 204 and 304 and other edge location or edge device elements in illustrative embodiments will be described in more detail below in conjunction with FIGS. 5 and 6.

It is to be understood that the particular set of elements shown are presented by way of illustrative example only, and in other embodiments additional or alternative elements may be used. Thus, another embodiment may include additional or alternative systems, devices and other network entities, as well as different arrangements of modules and other components. It is to be appreciated that these and other features of illustrative embodiments are presented by way of example only, and should not be construed as limiting in any way.

An exemplary process for managing component failure in edge hardware will now be described in more detail with reference to the flow diagram of FIG. 4. It is to be understood that this particular process is only an example, and that additional or alternative processes for managing component failure in edge hardware can be carried out in other embodiments.

The process 400 as shown includes steps 402 through 408, and is suitable for use in the edge devices 101, 201 and/or 301 but is more generally applicable to other types of systems where component failure is to be managed. Other arrangements of edge devices, redundant components, counters and other edge location or edge device elements can be configured to perform at least portions of one or more of the steps in other embodiments.

In step 402, a testing operation is executed on a plurality of redundant components of an edge device. The testing operation may be encoded in at least one SRAM location of the edge device. The executing of the testing operation is performed during certain time periods and not during other time periods. For example, time periods for performing the executing of the testing operation are dynamically adjusted based, at least in part, on when at least some of the plurality of redundant components are performing context switching and/or are in a refresh interval. In one or more embodiments, the executing of the testing operation is performed responsive to one or more of the plurality of redundant components reaching a threshold number of at least one of context switching occurrences and refresh interval occurrences. The plurality of redundant components comprise, but are not necessarily limited to, a plurality of CPUs, a plurality of storage devices, a plurality of NICs or a plurality of GPUs.

In step 404, based, at least in part, on the testing operation, at least one redundant component of the plurality of the redundant components is identified as having an operational issue. In step 406, the at least one redundant component is deactivated in response to the identifying, and, in step 408, one or more remaining redundant components of the plurality of the redundant components are utilized in one or more operations following the testing operation. In illustrative embodiments, the executing of the testing operation comprises executing a test workload on the plurality of redundant components, comparing respective outputs from the execution of the test workload by respective ones of the plurality of redundant components, and determining, based on the comparing, whether one or more of the respective outputs differs from a plurality of same outputs comprising a majority of the respective outputs. One or more of the plurality of redundant components corresponding to the one or more of the respective outputs differing from the plurality of same outputs is identified as the at least one redundant component having the operational issue.

In illustrative embodiments, the executing of the testing operation comprises storing test data in the plurality of redundant components, comparing respective instances of the test data stored by respective ones of the plurality of redundant components, and determining, based on the comparing, whether one or more of the respective instances of the test data differs from a plurality of same instances of the test data comprising a majority of the respective instances of the test data. One or more of the plurality of redundant components corresponding to the one or more of the respective instances of the test data differing from the plurality of same instances of the test data is identified as the at least one redundant component having the operational issue.

In illustrative embodiments, the executing of the testing operation comprises transmitting a first instance of test data from a first redundant component of the plurality of redundant components to a second redundant component of the plurality of redundant components, transmitting a second instance of the test data from the second redundant component back to the first redundant component, and comparing the first and second instances of the test data to determine whether there are differences between the first and second instances of the test data. The second redundant component is identified as the at least one redundant component having the operational issue responsive to an affirmative determination of differences between the first and second instances of the test data.

In one or more embodiments, a plurality of respective workloads are executed on the plurality of redundant components, wherein the executing of the plurality of respective workloads yields a plurality of respective outputs. The plurality of respective outputs are timestamped with a first time, and are stored in a storage location of the edge device such as, for example, a cache of the edge device. The executing of the testing operation is performed at a second time after the first time. An output of the plurality of respective outputs corresponding to at least one redundant component identified as having an operational issue is invalidated. One or more outputs of the plurality of respective outputs corresponding to the one or more remaining redundant components are validated and released from the storage location. A workload of the plurality of respective workloads corresponding to the invalidated output is re-executed on a remaining redundant component of the one or more remaining redundant components.

Figure 4:
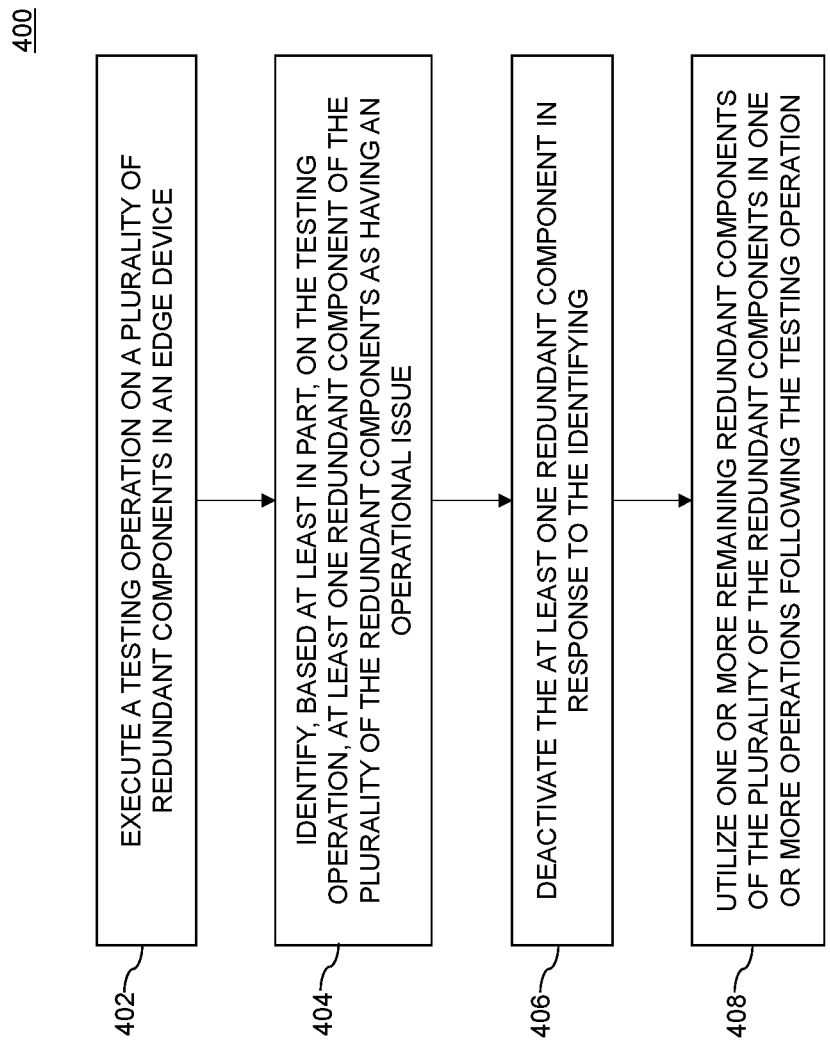
FIG. 4 is a flow diagram of an exemplary process for managing component failure in edge hardware in an illustrative embodiment.

It is to be appreciated that the FIG. 4 process and other features and functionality described above can be adapted for use with other types of systems configured to manage component failure in edge hardware.

The particular processing operations and other system functionality described in conjunction with the flow diagram of FIG. 4 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments provide technical solutions that periodically execute health checks on redundant components of edge devices using an algorithm encoded as a test workload stored in hardware (e.g., specially added registers or on-chip SRAMs). The embodiments permit fast execution times of test operations, with limited impact on edge device workload processing. Technical problems exist with current approaches, which reduce throughput by continuously running health checks on redundant hardware. The embodiments address this concern by providing technical solutions which run periodic test operations on redundant components, while continuously preventing output of errant results from the redundant components. Advantageously, the embodiments provide techniques for tagging and saving the workload results until health checks pass to ensure that errant results are prevented, even though health checks are periodically executed.

For example, in illustrative embodiments, if redundant components are found to be healthy following a testing operation, tags are removed, and the saved results of processing by redundant components determined to be healthy are released from storage and propagated. If, however, a redundant component is not found to be healthy following a testing operation, the saved result of processing by the unhealthy redundant component is discarded, and a workload corresponding to the saved result is re-executed on a healthy one of the redundant components. Advantageously, the embodiments also provide technical solutions which schedule testing operations while redundant components are performing non-workload related tasks (e.g., context switching, refresh operations, etc.) such that impact on throughput is reduced when compared with conventional approaches.

As an additional advantage, the embodiments are applicable to multiple types of hardware, including, but not necessarily limited to, CPUs, GPUs, NICs and storage devices, and provide techniques for efficiently isolating faulty components from processing new workloads until the faulty components can re-tested and deemed healthy. Advantageously, the embodiments provide technical solutions which compare outputs of redundant components from a testing operation to determine inconsistencies, and to deactivate the components producing the inconsistencies, while allowing healthy components to continue to process workloads. Accordingly, the embodiments facilitate the identification and isolation of faulty components without disabling an entire system.

Technical problems exist in that access to and control of edge devices in certain edge locations (e.g., telecommunications towers, outer space, rooftops, power stations, hospitals, etc.) may be difficult, thereby requiring management of the health of edge device redundancies and techniques for addressing failure of redundant components. For example, within hospitals, there may be closets on each floor filled with gateway devices and other computers used to communicate with and process data from remote medical equipment used for each patient. Such remote equipment may include, for example, smart beds, blood pressure monitors, pulse oximeters and drug infusion pumps. Each medical device may have its own associated gateway, resulting in a proliferation of compute devices in an edge location without IT oversight, cooling, robust power, stable racking, and other benefits of a data center.

The embodiments advantageously provide technical solutions which counter the increased chances and associated risks of component failure in adverse edge locations by providing techniques for maintaining redundancy within edge devices by isolating problematic components and continuing to use healthy components in parallel processing. An edge device and/or other edge hardware incorporating the technical solutions of the embodiments described herein includes built-in redundancies and, in the event of failure of one or more of its components, fails over to itself (e.g., to redundant components which are elements of the device) instead of to a separate device. As a result, the embodiments provide an efficient solution in terms of power and space consumption, management and orchestration, with improved overall reliability and performance.

It is to be appreciated that the particular advantages described above and elsewhere herein are associated with particular illustrative embodiments and need not be present in other embodiments. Also, the particular types of information processing systems and/or edge location and device features and functionality as illustrated in the drawings and described above are exemplary only, and numerous other arrangements may be used in other embodiments.

As noted above, at least portions of the edge devices 101, 201 and 301, redundant components 102, 202 and 302, counters 104, 204 and 304 and other edge location or edge device elements, may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise a cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the edge devices 101, 201 and 301 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a cloud service provider in illustrative embodiments.

Illustrative embodiments of processing platforms utilized to implement functionality for managing component failure in edge hardware will now be described in greater detail with reference to FIGS. 5 and 6. Although described in the context of edge locations 100, 200 and 300, and edge devices 101, 201 and 301 or other edge locations and devices, these platforms may also be used to implement at least portions of other information processing systems in other embodiments.

Figure 5:
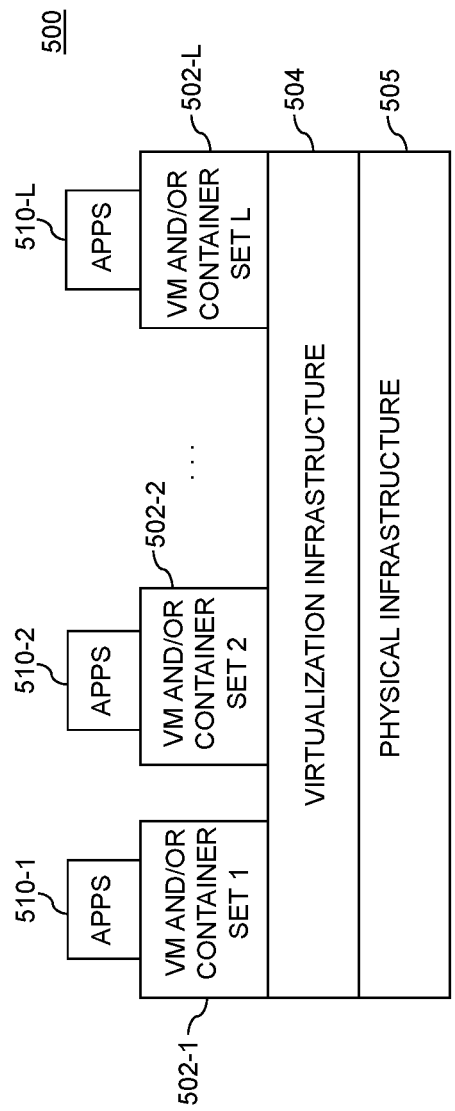

FIG. 5 shows an example processing platform comprising cloud infrastructure 500. The cloud infrastructure 500 comprises a combination of physical and virtual processing resources that may be utilized to implement at least a portion of the edge locations 100, 200 and 300, and edge devices 101, 201 and 301 or other edge locations and devices. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of edge locations 100, 200 and 300, and edge devices 101, 201 and 301 or other edge locations and devices may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of edge locations 100, 200 and 300, and edge devices 101, 201 and 301 or other edge locations and devices or the components thereof, and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the edge locations 100, 200 and 300, and edge devices 101, 201 and 301 or other edge locations and devices may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for utilizing workload stealing to distribute edge workloads between edge nodes attached thereto as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, edge locations, edge devices, redundant components, counters, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    executing a testing operation on a plurality of redundant components of an edge device;
    identifying, based, at least in part, on the testing operation, at least one redundant component of the plurality of redundant components as having an operational issue;
    deactivating the at least one redundant component in response to the identifying;
    utilizing one or more remaining redundant components of the plurality of redundant components in one or more operations following the testing operation;
    executing a plurality of respective workloads on the plurality of redundant components, wherein the executing of the plurality of respective workloads yields a plurality of respective outputs;

timestamping the plurality of respective outputs with respective times, wherein the executing of the testing operation is performed at a time after the respective times;

invalidating at least one output of the plurality of respective outputs corresponding to the at least one redundant component and timestamped with a corresponding one of the respective times; and re-executing at least one workload of the plurality of respective workloads corresponding to the at least one invalidated output on a remaining redundant component of the one or more remaining redundant components to produce at least one new output in place of the at least one invalidated output;

wherein the method is performed by at least one processing device comprising a processor coupled to a memory.

2. The method of claim 1, wherein the plurality of redundant components comprise one of a plurality of central processing units, a plurality of storage devices, a plurality of network interface controllers and a plurality of graphics processing units.

3. The method of claim 1, wherein the executing of the testing operation comprises:

executing a test workload on the plurality of redundant components;

comparing respective outputs from the execution of the test workload by respective ones of the plurality of redundant components; and determining, based on the comparing, whether one or more of the respective outputs differs from a plurality of same outputs comprising a majority of the respective outputs;

wherein one or more of the plurality of redundant components corresponding to the one or more of the respective outputs differing from the plurality of same outputs is identified as the at least one redundant component having the operational issue.

4. The method of claim 1, wherein the executing of the testing operation comprises:

storing test data in the plurality of redundant components;

comparing respective instances of the test data stored by respective ones of the plurality of redundant components; and determining, based on the comparing, whether one or more of the respective instances of the test data differs from a plurality of same instances of the test data comprising a majority of the respective instances of the test data;

wherein one or more of the plurality of redundant components corresponding to the one or more of the respective instances of the test data differing from the plurality of same instances of the test data is identified as the at least one redundant component having the operational issue.

5. The method of claim 1, wherein the executing of the testing operation comprises:

transmitting a first instance of test data from a first redundant component of the plurality of redundant components to a second redundant component of the plurality of redundant components;

transmitting a second instance of the test data from the second redundant component back to the first redundant component; and comparing the first and second instances of the test data to determine whether there are differences between the first and second instances of the test data;

wherein the second redundant component is identified as the at least one redundant component having the operational issue responsive to an affirmative determination of differences between the first and second instances of the test data.

6. The method of claim 1, wherein the executing of the testing operation is performed periodically.

7. The method of claim 1, wherein time periods for performing the executing of the testing operation are dynamically adjusted, and wherein the dynamic adjustment is based, at least in part, on when at least some of the plurality of redundant components at least one of are performing context switching and are in a refresh interval.

8. The method of claim 7, wherein the executing of the testing operation is performed responsive to one or more of the plurality of redundant components reaching a threshold number of at least one of context switching occurrences and refresh interval occurrences.

9. The method of claim 1, further comprising storing the plurality of respective outputs in a storage location of the edge device.

10. The method of claim 9, wherein the storage location comprises a cache of the edge device.

11. The method of claim 9, further comprising validating one or more outputs of the plurality of respective outputs corresponding to the one or more remaining redundant components.

12. The method of claim 11, further comprising releasing the one or more validated outputs from the storage location.

13. The method of claim 1, wherein the testing operation is encoded in at least one static random access memory location of the edge device.

14. An apparatus, comprising:

at least one processor and at least one memory storing computer program instructions wherein, when the at least one processor executes the computer program instructions, the apparatus is configured:

to execute a testing operation on a plurality of redundant components of an edge device;

to identify, based, at least in part, on the testing operation, at least one redundant component of the plurality of redundant components as having an operational issue;

to deactivate the at least one redundant component in response to the identifying;

to utilize one or more remaining redundant components of the plurality of redundant components in one or more operations following the testing operation;

to execute a plurality of respective workloads on the plurality of redundant components, wherein the executing of the plurality of respective workloads yields a plurality of respective outputs;

to timestamp the plurality of respective outputs with respective times, wherein the executing of the testing operation is performed at a time after the respective times;

to invalidate at least one output of the plurality of respective outputs corresponding to the at least one redundant component and timestamped with a corresponding one of the respective times; and to re-execute at least one workload of the plurality of respective workloads corresponding to the at least one invalidated output on a remaining redundant component of the one or more remaining redundant components to produce at least one new output in place of the at least one invalidated output.

15. The apparatus of claim 14, wherein the apparatus is further configured
to store the plurality of respective outputs in a storage location of the edge device.

16. The apparatus of claim 15, wherein the apparatus is further configured
to validate one or more outputs of the plurality of respective outputs corresponding to the one or more remaining redundant components.

17. A computer program product stored on a non-transitory computer-readable medium and comprising machine executable instructions, the machine executable instructions, when executed, causing a processing device:
to execute a testing operation on a plurality of redundant components of an edge device;
to identify, based, at least in part, on the testing operation, at least one redundant component of the plurality of redundant components as having an operational issue;
to deactivate the at least one redundant component in response to the identifying;
to utilize one or more remaining redundant components of the plurality of redundant components in one or more operations following the testing operation;
to execute a plurality of respective workloads on the plurality of redundant components, wherein the executing of the plurality of respective workloads yields a plurality of respective outputs;
to timestamp the plurality of respective outputs with respective times, wherein the executing of the testing operation is performed at a time after the respective times;
to invalidate at least one output of the plurality of respective outputs corresponding to the at least one redundant component and timestamped with a corresponding one of the respective times; and
to re-execute at least one workload of the plurality of respective workloads corresponding to the at least one invalidated output on a remaining redundant component of the one or more remaining redundant components to produce at least one new output in place of the at least one invalidated output.

18. The computer program product of claim 17, wherein the machine executable instructions further cause the processing device
to store the plurality of respective outputs in a storage location of the edge device.

19. The computer program product of claim 18, wherein the machine executable instructions further cause the processing device
to validate one or more outputs of the plurality of respective outputs corresponding to the one or more remaining redundant components.

20. The computer program product of claim 19, wherein the machine executable instructions further cause the processing device to release the one or more validated outputs from the storage location.

\* \* \* \* \*